(12) United States Patent
Nakayama (10) Patent No.: US 8,296,322 B2
(45) Date of Patent: Oct. 23, 2012

(54) USER TERMINAL DEVICE AND METHOD FOR CONTROLLING THE SAME

(75) Inventor: Koji Nakayama, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 440 days.

(21) Appl. No.: 12/561,482

(22) Filed: Sep. 17, 2009

(65) Prior Publication Data

US 2010/0106698 A1  Apr. 29, 2010

(30) Foreign Application Priority Data

Oct. 24, 2008  (JP) ................................ 2008-274099

(51) Int. Cl.
*G06F 17/30* (2006.01)
(52) U.S. Cl. ...................................... 707/782; 707/783
(58) Field of Classification Search .................. 707/782, 707/783
See application file for complete search history.

(56) References Cited

U.S. PATENT DOCUMENTS

| | | | |
|---|---|---|---|
| 7,953,948 B1 * | 5/2011 | Dyatlov et al. ............... | 711/163 |
| 2006/0123010 A1 * | 6/2006 | Landry et al. .................. | 707/10 |
| 2008/0114956 A1 * | 5/2008 | Safa et al. ..................... | 711/163 |

FOREIGN PATENT DOCUMENTS

| | | |
|---|---|---|
| CN | 101288055 A | 10/2008 |
| EP | 1 956 491 A1 | 8/2008 |
| JP | 2007-164652 A | 6/2007 |
| JP | 2008-84140 A | 4/2008 |

OTHER PUBLICATIONS

International Business Machines Corporation, "Graphics congestion control system for store systems", Research Disclosure, Jul. 1, 2000, 6 pp., vol. 435, No. 177, Mason Publications, Hampshire, GB, XP007126545, ISSN: 0374-4353.

* cited by examiner

*Primary Examiner* — Phong Nguyen
*Assistant Examiner* — Dennis Myint
(74) *Attorney, Agent, or Firm* — Mattingly & Malur, PC (57) ABSTRACT

A method is provided that automatically saves data on a user terminal of a thin client system to a file server or to the user terminal by appropriately and efficiently sorting the data. System update data such as a patch for the user terminal and confidential data that should be saved to the server are distinguished when written to a secondary storage device, and separately cached into memory. Then, the confidential data that should be saved to the server is automatically uploaded to the file server at any given timing, for example, at shut-down of the terminal, whereby a minimum amount of data can be efficiently saved to the file server.

7 Claims, 8 Drawing Sheets

System configuration of the present invention

FIG. 1

System configuration of the present invention

Operation flow of file access conrol module

FIG. 4

Operation flow of write control module

FIG. 5

Operation flow of automatic backup module

FIG. 6

Operation flow at start-up

FIG. 7

Operation flow at shut-down

FIG. 8

Table 1: Application control file

| No | Application name | Write flag |
|---|---|---|
| 1 | System | FALSE |
| 2 | Update | TRUE |
| 3 | Document Creator | FALSE |
| 4 | ... | ... |

Table 2: Upload list file

| Entry No. | File path | Transfer destination path | Date (and other meta information) |
|---|---|---|---|
| 1 | C:¥xxx¥111.xxx | ¥¥FS¥userfolder¥111.xxx | 01/01/200x |
| 2 | C:¥xxx ¥222.xxx | ¥¥FS¥userfolder¥222.xxx | 01/01/200x |
| 3 | ... | ... | ... |

901 902 903 904 905

USER TERMINAL DEVICE AND METHOD FOR CONTROLLING THE SAME

BACKGROUND OF THE INVENTION

1. Field of the Invention

The present invention relates to a user terminal device and a method for controlling the same. For example, the invention relates to a user terminal device constituting part of a thin client system that consolidates user data into a file server and prevents loss and leakage of confidential information, and a method for controlling such a device.

2. Background Art

In recent years, thin client systems have been devised as a system that prevents diffusion of critical data stored in a file server by way of user terminals. As such a thin client system, a terminal (a diskless PC) that does not have a built-in non-volatile secondary storage device is typically used. However, there also exist systems that use a PC (personal computer) having a write-controlled secondary storage device as a thin client terminal. For example, Reference 1 (JP Patent Publication (Kokai) No. 2007-172063 A) discloses a terminal having a secondary storage device in which, upon issuance of a write request from an application to the secondary storage device, the write request is redirected to a primary storage device (cache memory), whereby writing to the secondary storage device is controlled and a terminal that does not have secondary storage in semblance is realized.

When a PC having a write-controlled secondary storage device is used as a thin client terminal, the load on the server can be lighter than a case in which a diskless PC is used. Thus, the cost for constructing infrastructures and the like can be advantageously reduced. With such a system, it is possible to prevent diffusion of critical data stored in a file server, to prevent the OS setup from being improperly changed by a user, and to prevent installation of applications.

However, since the system of Reference 1 does not allow for storage of system update data such as an OS patch into the secondary storage device, the system cannot be kept up-to-date. In contrast, a system as disclosed in Reference 2 (JP Patent Publication (Kokai) No. 2008-59501 A) has been proposed as a system in which only the system update data is allowed to be stored into a secondary storage device of a user terminal. In Reference 2, two filter devices that are a write-permission filter device and a write-inhibition filter device are generated at a lower level of a file system. A file access control driver, which is a filter driver located at a higher level of the file system, detects file access from a write-inhibited application, and redirects such access to the write-inhibition filter device. Accordingly, it is possible to control the storage operation on a file basis or folder basis when performing writing to the secondary storage device. With such means, it is possible to store only the system update data into the secondary storage device of the user terminal to keep the system up-to-date.

SUMMARY OF THE INVENTION

However, each of the thin client terminals disclosed in References 1 and 2 is based on the premise that the terminal is shut down after a user has edited or saved data on/to the file server or after a user has locally downloaded confidential data from a filer server to edit it and has manually uploaded the thus edited data onto the server. Therefore, if a user fails to upload to the server the confidential data that he/she has locally downloaded and edited, the latest confidential data would disappear at shut-down of the terminal, which is problematic. As a countermeasure against such a problem, it might be a good idea to simply transfer a backup of the system to the file server at shut-down of the terminal. However, in such a case, huge volumes of unwanted data would be saved concurrently. Thus, such a system cannot be considered practical. For this reason, means for efficiently backing up and saving data is desired.

The present invention has been made in view of the foregoing, and the present invention provides a technique of efficiently backing up confidential data that has been edited, to a file server in a thin client terminal device.

In order to solve the aforementioned problems, a user terminal device of the present invention includes file access control means (a file access control module) that determines the kind of an I/O request issued to a secondary storage device and determines, if the I/O request is a write request, if an application that is the source of the I/O request is permitted to write data to the secondary storage device, write control means (a write control module) that redirects and stores to a cache memory data that has been requested to be written, upload data management means (an automatic backup module and an upload list file) that, if the application that is the source of the I/O request is not permitted to write data to the secondary storage device, manages and uploads to the file server the data that has been requested to be written, and automatic backup means (the automatic backup module) that reads the data managed by the upload data management means from the cache memory and uploads it to the file server at any given timing.

The write control means includes first redirecting means (a volume filter device) that processes a write request and a read request, and second redirecting means (a shadow volume device) that processes only a write request. Each of the first redirecting means and the second redirecting means, if the file access control means has determined that the application that is the source of the write request is permitted to write data to the second storage device, stores into the cache memory the data that has been requested to be written. It should be noted that the second redirecting means writes the data stored in the cache memory to the secondary storage device at any given timing.

The first redirecting means, if the file access control means has determined that the application that is the source of the write request is not permitted to write data to the secondary storage device, stores into the cache memory the data that has been requested to be written.

The first redirecting means, if the file access control means has determined that the I/O request is a read request, reads from the cache memory or from the secondary storage device data that has been requested to be read.

Further features of the present invention will become apparent from the following preferred embodiments and accompanying drawings for carrying out the present invention.

According to the present invention, confidential data that has been edited can be efficiently backed up to a file server in a thin client terminal device.

DESCRIPTION OF SYMBOLS 101 user terminal
102 file server
103 network
104 OS
105 application
106 file access control module
107 automatic backup module
108 device control module
109 write control module
110 application control file
111 secondary storage device
112 confidential data Detailed Description of the Preferred Embodiments The present invention relates to a method of automatically saving data on a user terminal to a file server or to the user terminal appropriately, in a thin client system that consolidates user data into the filer server and prevents loss and leakage of confidential information, by controlling writing to a secondary storage device of the user terminal and controlling writing to external storage media.

Hereinafter, embodiments of the present invention will be described with reference to the accompanying drawings. It should be noted that the following embodiments are illustrative only for the purpose of carrying out the present invention, and are not intended to limit the technical scope of the present invention. In addition, structures that are common to all of the drawings are denoted by common reference numerals.

<Configuration of Information Processing System>

Figure 1:
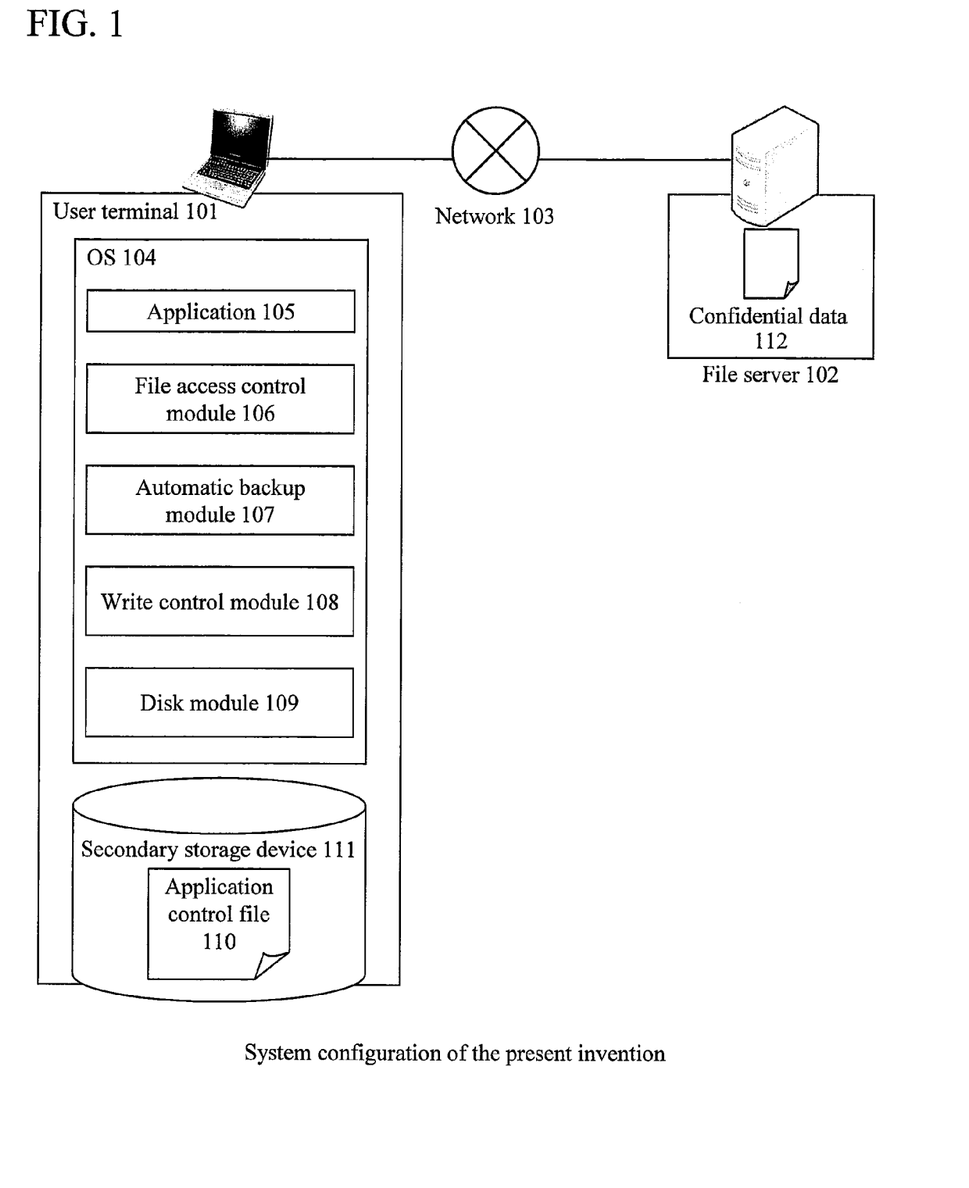
FIG. 1 illustrates the schematic configuration of a thin client system in accordance with an embodiment of the present invention.

FIG. 1 illustrates the schematic configuration of an information processing system (a data backup system) in accordance with an embodiment of the present invention. This information processing system includes a user terminal 101 and a file server 102 that are connected via a network 103. The network 103 herein can be realized using a local area network (LAN), a wide area network (WAN), or a network commonly known as a peer-to-peer network or the like. Examples of the user terminal include a typical PC having a CPU, a primary storage device, a network device, an input/output device, and a secondary storage device. The form of the user terminal, such as whether it is portable or not is not restricted.

On the user terminal 101, an OS 104, an application 105 such as a document creator or a browser, a file access control module 106, an automatic backup module 107, a device control module (also referred to as a write control module) 108, and a disk module 109 are installed. A secondary storage device 111 has stored therein an application control file 110. Further, the user terminal 101 includes, though not shown in FIG. 1, a controller (CPU), memory, a network interface, an input/output device (e.g., a keyboard, a display, and a speaker), and the like.

The file server 102 includes, though not shown in FIG. 1, a CPU, a primary storage device, a network device, an input/output device, a secondary storage device, and the like, and is capable of transferring files by establishing connection to the user terminal 101. The file server 102 is a typical file server in which confidential data 112 that has been created or edited with the application 105 of the user terminal 101 can be stored. The file server 102 includes folders for storing data created on the respective user terminals, for each individual user terminal.

A user can access the confidential data 112 on the file server 102 to use and edit it, using the application 105 running on the OS 104 of the user terminal 101. At this time, the user can select whether to use and edit the confidential data 112, which is located on the file server 102, on the file server 102 or download it to the user terminal 101 (local) and edit it on the user terminal 101.

When shutting down the user terminal 101, the user, if he/she has used and edited the confidential data 112 on the file server 102, saves the edited confidential data 112 to the file server 102 and shuts down the terminal. Meanwhile, if the user has locally downloaded the confidential data 112 and edited it, the automatic backup module 107 automatically uploads (saves) the confidential data 112 to the file server 102 at shut-down of the user terminal. Accordingly, it becomes possible to eliminate the inadvertent loss of the confidential data 112 that the user has edited. It should be noted that the confidential data 112 that a user has locally downloaded to use and edit it can be manually uploaded to the file server 102 by the user. However, in that case, a configuration is desirably used that prompts the user to upload the confidential data at shut-down of the user terminal in order to prevent the user from failing to upload the file.

The device control module 108 of the user terminal 101 has functions of detecting external storage media such as a USB and controlling writing to the external storage media. Detection of such external storage media is accomplished by detecting an external device with the use of the function of the OS, and writing control is accomplished by inhibiting access to the device or redirecting writing that has been issued to the device, to memory. With such functions, it is possible to prevent the confidential data on the file server from being stored into external media by way of the user terminal, to consolidate data, and to prevent leakage of information.

<Internal Configuration of User Terminal>

Figure 2:
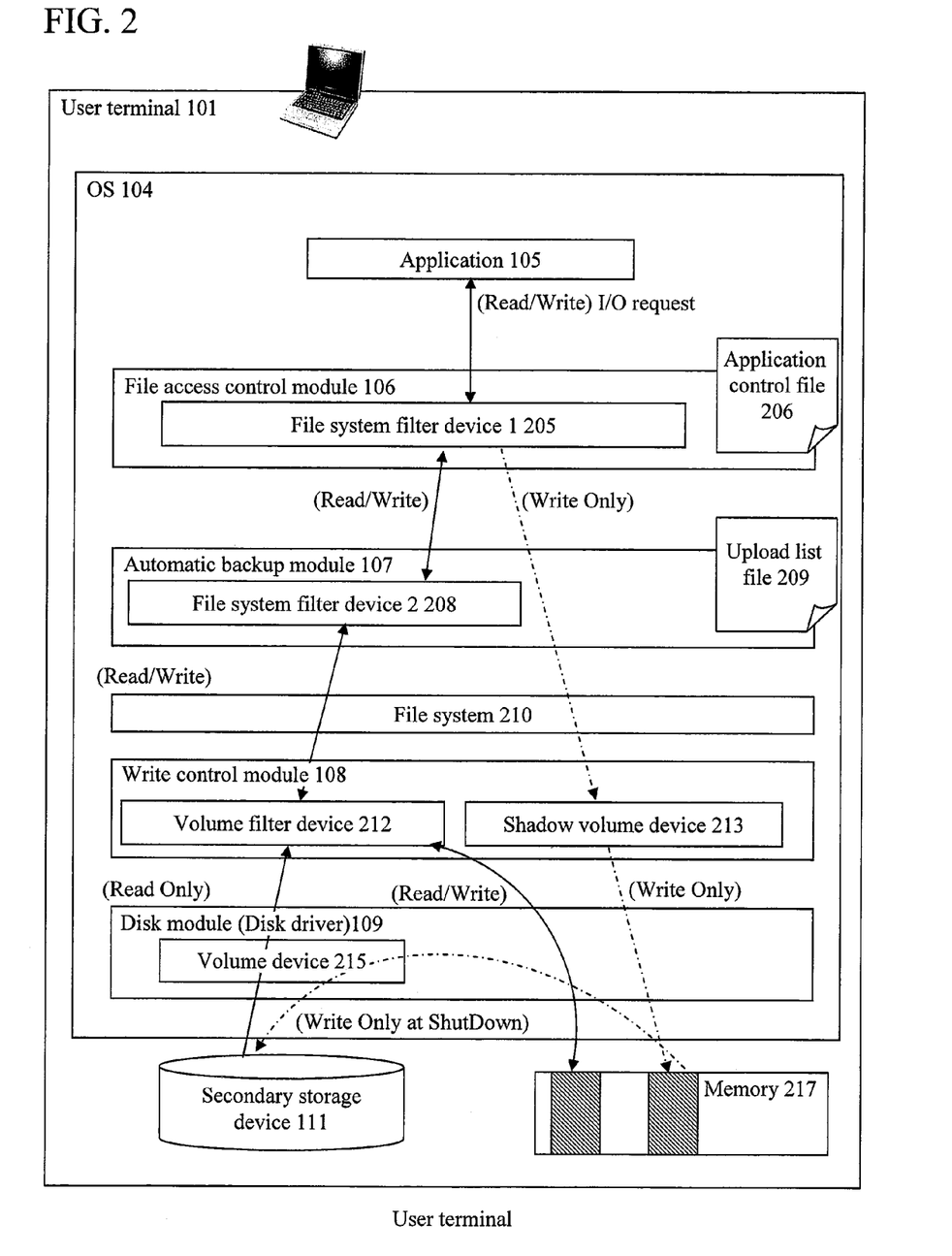
FIG. 2 illustrates the internal configuration of a user terminal.

FIG. 2 specifically illustrates the internal configuration, including the OS components, of the user terminal 101. The directed lines of FIG. 2 indicate the flow of I/O operations (in practice, operations other than read and write operations are also performed, but they are omitted) requested to the secondary storage device by a program such as an application or an OS module (for the sake of easier understanding of the description, not only application software such as a document creator but also a program such as an OS module that performs writing to the secondary storage device will be hereinafter simply referred to as an "application." Examples of such "application" include "Windows" (registered trademark) and system update applications such as "Update"). The solid lines of FIG. 2 indicate I/O mainly issued by an application, and dashed lines indicate I/O issued by the file access control module 106.

The file access control module 106 has a function of creating a file system filter device 1_205 which is to be attached to a file system 210 mounted on a volume device 215 and is capable of filtering I/O access to the secondary storage device 111 issued by the application 105. If the I/O access to the secondary storage device 111 issued by the application 105 is a write request, the file access control module 106 determines if the application, which is the source of the write request, is permitted to write data (hereinafter also referred to as a "write-permitted" application) or inhibited from writing data (hereinafter also referred to as a "write-inhibited" application). If the application is determined to be a "write-permitted" application, the file access control module 106 copies the data and sends them to both a volume filter device 212 and a shadow volume device 213. Meanwhile, if the application is determined to be a "write-inhibited" application, the file access control module 106 sends the data only to the volume filter device 212.

Examples of "write-permitted" applications include update programs for an OS or application software. Such programs are typically provided by the vendor of the OS or the application. Examples of "write-inhibited" applications include an application program that creates or edits confidential data and, typically, an application program for creating or editing documents.

Figure 8:
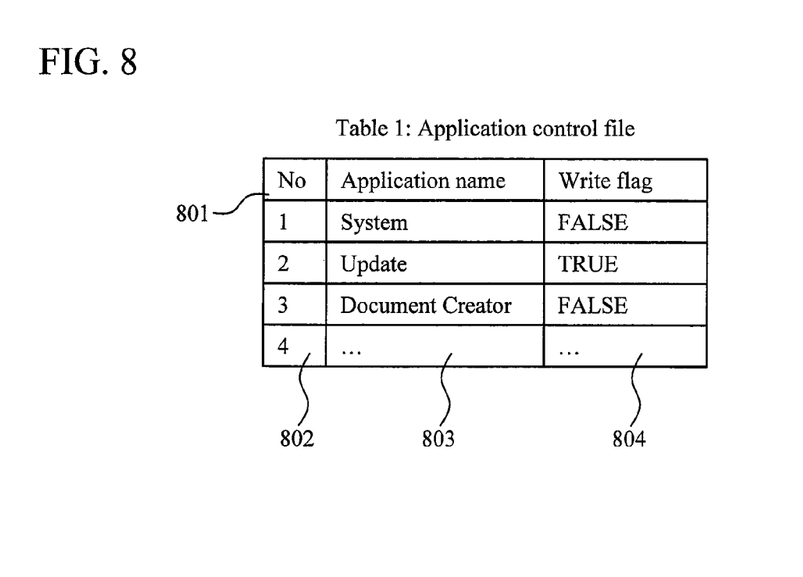
FIG. 8 is a chart (Table 1) illustrating an exemplary structure of an application control file.

The method of sorting programs, which are the sources of write requests, can be accomplished by installing an application control file 206 (e.g., FIG. 8 (Table 1)) on the user terminal 101.

The application control file 206 is a list-form file having a set of an application name 803 and a write inhibition/permission flag 804. Typical OS's can acquire an execution process name and process ID from an application name. Thus, by reading this list, it is possible to acquire a process name and process ID of an application running on the user terminal.

If the file access control module 106 is implemented as a filter driver of the file system, it becomes possible to acquire, upon receipt of a write request by the file system filter device 1_205, a process name and process ID of the source of the request. By referring to the process name and process ID acquired by the aforementioned means, it is possible to determine if the application, which is the source of the write request, is a "write-permitted" application or a "write-inhibited" application.

It should be noted that the application control file 206 is a file that is appropriately created by a system administrator based on the system policy of the user terminal and is installed in advance. Such an application control file can be updated concurrently with the update of the system. If general users are allowed to install applications, there is a possibility that some user may install malicious applications (for nefarious purposes). Thus, it is desirable that those other than the administrator be not allowed to install applications.

Hereinafter, the reason why the file access control module 106 writes data from the write-permitted program to both the volume filter device 212 and the shadow volume device 213 will be described. That is, in the present system, a read request (see the solid arrows) from the application is transferred in the following order: the file system filter device 1_205→a file system filter device 2_208→the file system 210→the volume filter device 212→the volume device 215. Finally, the volume device 215 returns data read from the secondary storage device 111 to the application 105, or returns data, which has been cached into memory 217 by the volume filter device 212, to the application 105. Therefore, if data has been written only to the shadow volume device 213, it follows that the old data in the secondary storage device 111 would be read. Accordingly, in a case in which data is written to the cache memory via the shadow volume device 213, the same data is written to the cache memory via the volume filter device 212, so that the latest data is returned upon receipt of a read request from the application. Accordingly, it is possible to avoid the possibility that the old data might be read and to reflect the latest control data into the system in real time without the need for rebooting.

Although the file access control module 106 has been described as feasible with a file system filter, those described herein are only exemplary and thus are not intended to limit the scope of the present invention. In addition to the method described herein, it is also possible to use a method in which write I/Os are sorted based on the file path of a write destination address that has been changed in the write application process.

The write control module 108 has a function of creating the following two devices: the volume filter device 212 that attaches to the volume device 215 (associated in a one-to-one relationship) and is capable of filtering I/O access to the secondary storage device 111 from the application 105, and the shadow volume device 213. Although description will be hereinafter made on the assumption that the write control module 108 is one type of filter driver of a disk driver, other methods can also be used to realize the function of the write control module 108.

The volume filter device 212 has functions of attaching to the volume device 215 of the secondary storage device 111 and redirecting and caching to-be-written data to the memory 217. The term "attach" as used herein refers to one exemplary means for acquiring I/O data when the application 105 performs I/O to the second storage device 111. However, any methods other than the "attach" method can be used as long as such methods allow for acquiring data on I/O performed to the volume by a given program.

The shadow volume device 213 has a function of caching into the memory data that the shadow volume device 213 has been instructed to write. The shadow volume device 213 will never attach to the volume device 215 of the secondary storage device 111. However, the shadow volume device 213 recognizes the presence of the volume device 215, and is capable of writing, at shut-down, data that the shadow volume device 213 has cached, to the secondary storage device via the volume device 215. It should be noted that a write request to the shadow volume device 213 is issued only by the file access control module 106.

The automatic backup module 107 has functions of recognizing the confidential data 112 that a user has locally downloaded and automatically uploading the confidential data 112 that the user has edited, to the file server 102 at any given timing (for example, at shut-down or periodically). It should be noted that connection to the file server 102 in uploading the data is established using a typical network protocol. For example, a file sharing protocol such as SMB or CIFS is used, and a folder is be assigned as a network drive. Then, after changing a file path for the drive, a given file may be redirected or transferred in accordance with a FTP protocol.

It should be noted that described herein is an example in which a minimum amount of data is collectively uploaded at shut-down by prioritizing the reduction of the network traffic, as exemplary efficient uploading.

Alternatively, a method can be used in which each file is uploaded in the process of closing the file. Typically, an application running on an information terminal backs up recovery data just in case the application crashes. Thus, even if the application has crashed, data can be recovered. By uploading data to a server upon completion of editing of the application, that is, at the point when a user has closed the application, it is possible to efficiently back up the data that the user wishes to save while reducing the network traffic.

As a further alternative example, a method can be used in which each file is uploaded each time the file is written. Such a method would increase the network traffic. However, if the terminal has crashed, data on the server would remain, whereas data on the information terminal would disappear. Thus, since only the necessary data would remain on the server, it is possible to realize uploading with an excellent data protection function. Such an uploading method can be readily realized with the automatic backup module.

Data that is a target to be automatically backed up by the automatic backup module 107 is data created or edited by a "write-inhibited" application, i.e., an application program that creates or edits confidential data, for example. The automatic backup module 107 is realized by implementing the automatic backup module 107 as a file system filter and monitoring a file creation request. It should be incidentally noted that the "file creation request" is a request that is issued not only when a user intends to newly create a file on the information terminal 101 (locally) but also when a user intends to locally download a file from the file server 102. This is because download processing in the file system corresponds to the creation of a new file on a local device and copying thereto data from the server.

Figure 9:
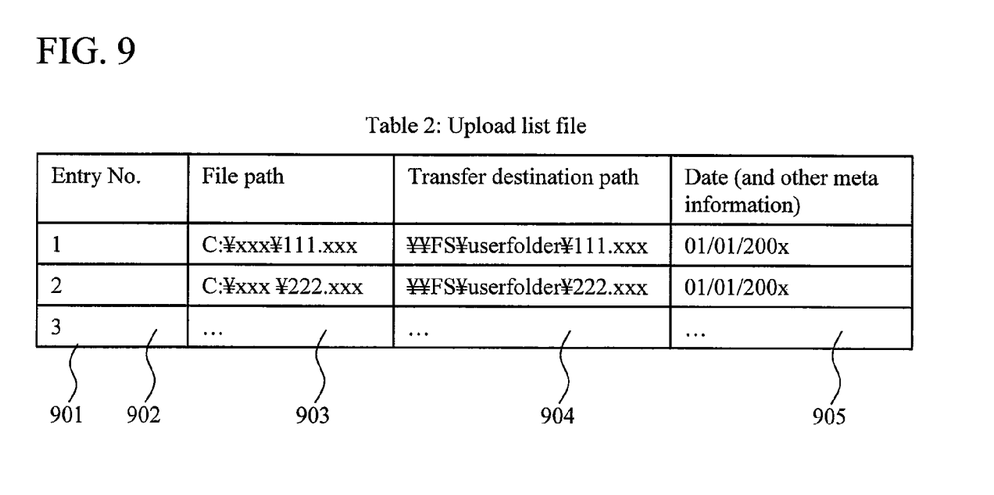
FIG. 9 is a chart (Table 2) illustrating an exemplary structure of an upload list file.

When a new file creation request is issued, the process name of the application, which is the source of the creation (request), is identified, and all of "write-inhibited" files are set as the target files to be uploaded and file paths 903 thereof are registered in a "upload list file" 209 (Table 2 of FIG. 9).

The upload list file 209 is a file having registered therein a list of files to be automatically uploaded to the file server at shut-down. It is also possible to use a method that includes searching created file paths for a target file with reference to the file extension thereof, identifying the process name of the application, which is the source of the creation (request), and registering the file in the upload list file. In registration, a transfer destination path 904 indicating the storage location on the file server is also registered. Further, meta information 905 on files and the like can also be registered. At shut-down of the user terminal 101, the automatic backup module 107 uploads data to a given folder on the file server 102 with reference to the upload list file 209. The given folder on the file server herein refers to a folder, which is assigned to each individual user terminal, on the file server 102. Such a folder can be prepared in advance or newly created when connection to the user terminal is established. For example, it is possible to newly create a folder indicative of the date and the user terminal name by using the meta information 905 of the upload list file and to save data into such a folder. Accordingly, it becomes possible to address the problem that if a user fails to save a file to the file server, such a file could disappear.

Writing requested by a write-permitted program is directed to the secondary storage device 111 of the user terminal. Thus, such data needs not be uploaded to the file server 102. Accordingly, this method is advantageous in that the upload time and data transfer volume can be suppressed, differently from the method in which all of data on a local machine is backed up.

<Operation of File Access Control Module>

Figure 3:
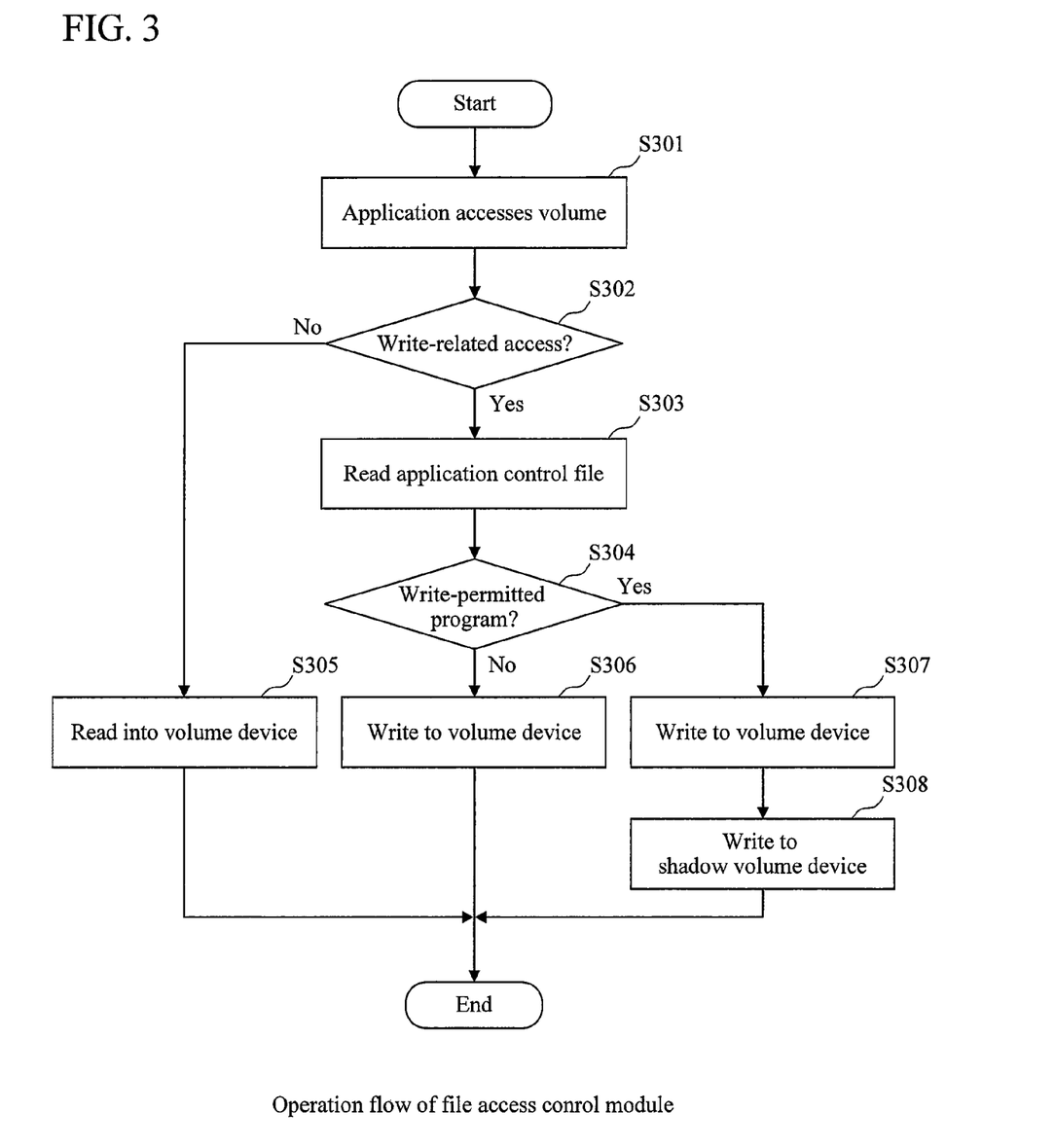
FIG. 3 is a flowchart illustrating the operation of a file access control module.

FIG. 3 is a flowchart illustrating the process operation of the file access control module 106.

First, when the application 105 accesses the volume device 215, the file access control module 106 detects the access (step S301). Then, the file access control module 106 first determines if the request is a write-related request (step S302). It should be noted that a write-related request refers to a so-called write request directed to the secondary storage device. Examples of such write-related request include not only a write request but also a request for modifying attributes of a file and the like.

If the request is not a write-related request, the file access control module 106 transfers the request to the volume device 215 and terminates the process (step S305). If the request is a write-related request, the file access control module 106 reads the application control file 206 (step S303), inquires of the OS about the process name of the write process and acquires it, and then the file access control module 106 compares the acquired name with the process name corresponding to the application name of the list so as to acquire a write flag of the matching entry, and determines if the application is permitted to write data or not (step S304).

If the write flag indicates "TRUE," it means that write is "permitted," and the file access control module 106 transfers the write-related request to the volume device 215 (step S307). Thereafter, the file access control module 106 also writes the same data to the shadow volume device 213 (step S308) and terminates the process.

Meanwhile, if the write flag indicates "FALSE" in step S304, it means that write is "inhibited." Thus, the file access control module 106 transfers the write-related request to the volume device 215 (step S306) and terminates the process.

<Operation of Write Control Module>

Figure 4:
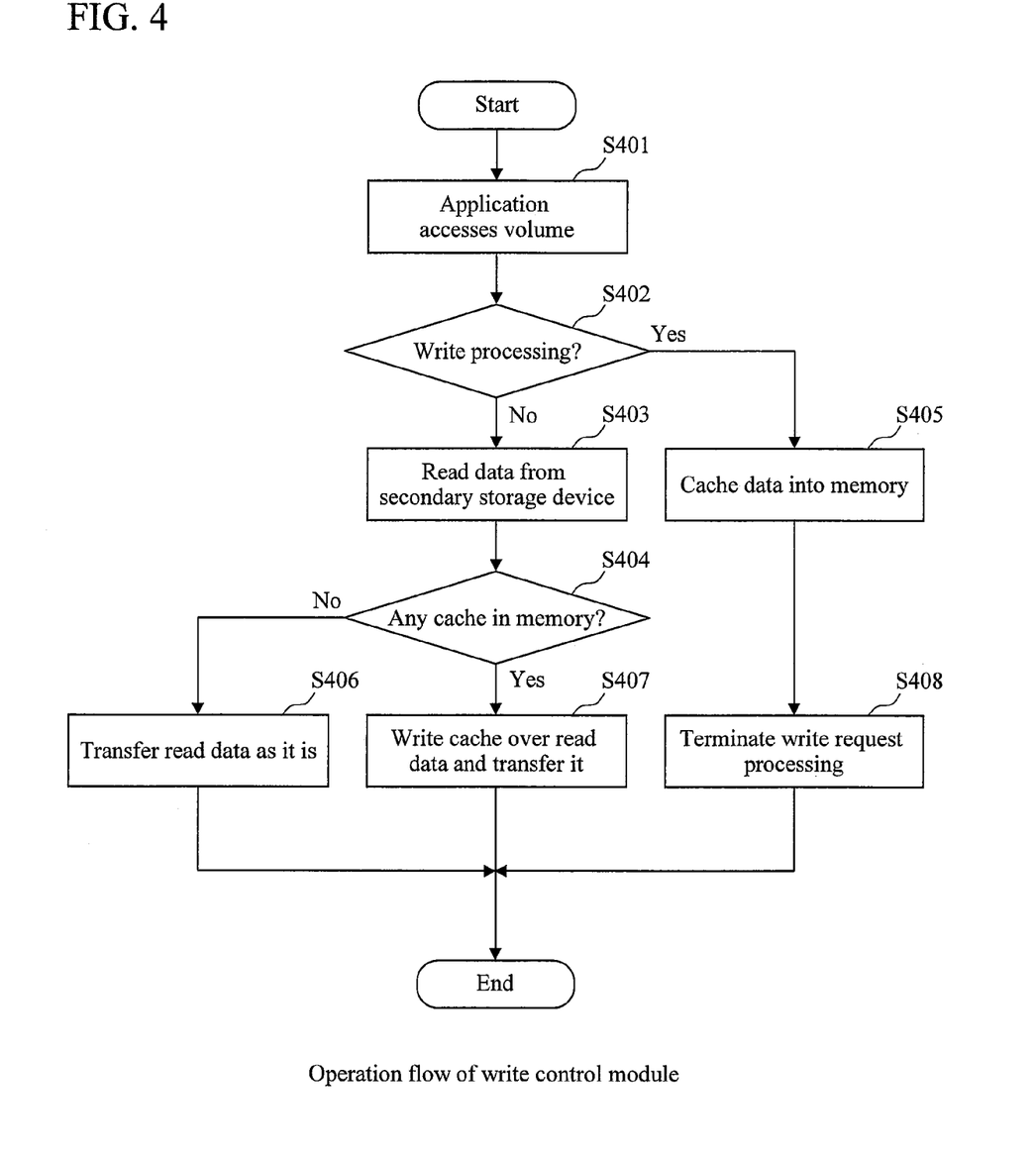
FIG. 4 is a flowchart illustrating the operation of a write control module.

FIG. 4 is a flowchart illustrating the process operation of the volume filter device 212 of the write control module 108. It should be noted that in FIG. 4, the shadow volume device 213 necessarily operates in the following order: steps S401→S402→S405→S408. The processing performed to the shadow volume device 213 is only the write processing performed by the file access control module 106. In addition, the shadow volume device 213 transfers cached data (i.e., control data, but not including confidential data) to the volume device 215 at any given timing, for example, at shut-down, so as to store the data into the secondary storage device 111. In this manner, the operation of the shadow volume device 213 differs from that of the volume filter device 212. Operation of the shadow volume device 213 at shut-down will be described with reference to FIG. 6.

When access to the volume device 215 (the secondary storage device 111) by the application 105 is detected (step S401), each of the volume filter device 212 and the shadow volume device 213 determines if the request is a write-related request (step S402).

If the request is determined to be a write-related request, each of the volume filter device 212 and the shadow volume device 213 caches the to-be-written data into an area provided in the memory 217 (step S405). It should be noted that in typical PCs in which writing is not controlled, such a write-related request is transferred to a volume device and is written to a secondary storage device.

If the request is not determined to be a write-related request (although a read request is exclusively described herein, the request is not limited thereto and can also include other requests), the volume filter device 212 reads data from the volume device 215 (the secondary storage device 111) (step S403).

Thereafter, the volume filter device 212 determines if the memory 217 contains cached data (step S404). If the memory 217 does not contain cached data, the volume filter device 212 returns the read data as it is to the application (step S406). If the memory 217 contains cached data, the volume filter device 212 writes the cached data over the read data, and returns it to the application (step S407).

<Operation of Automatic Backup Module>

Figure 5:
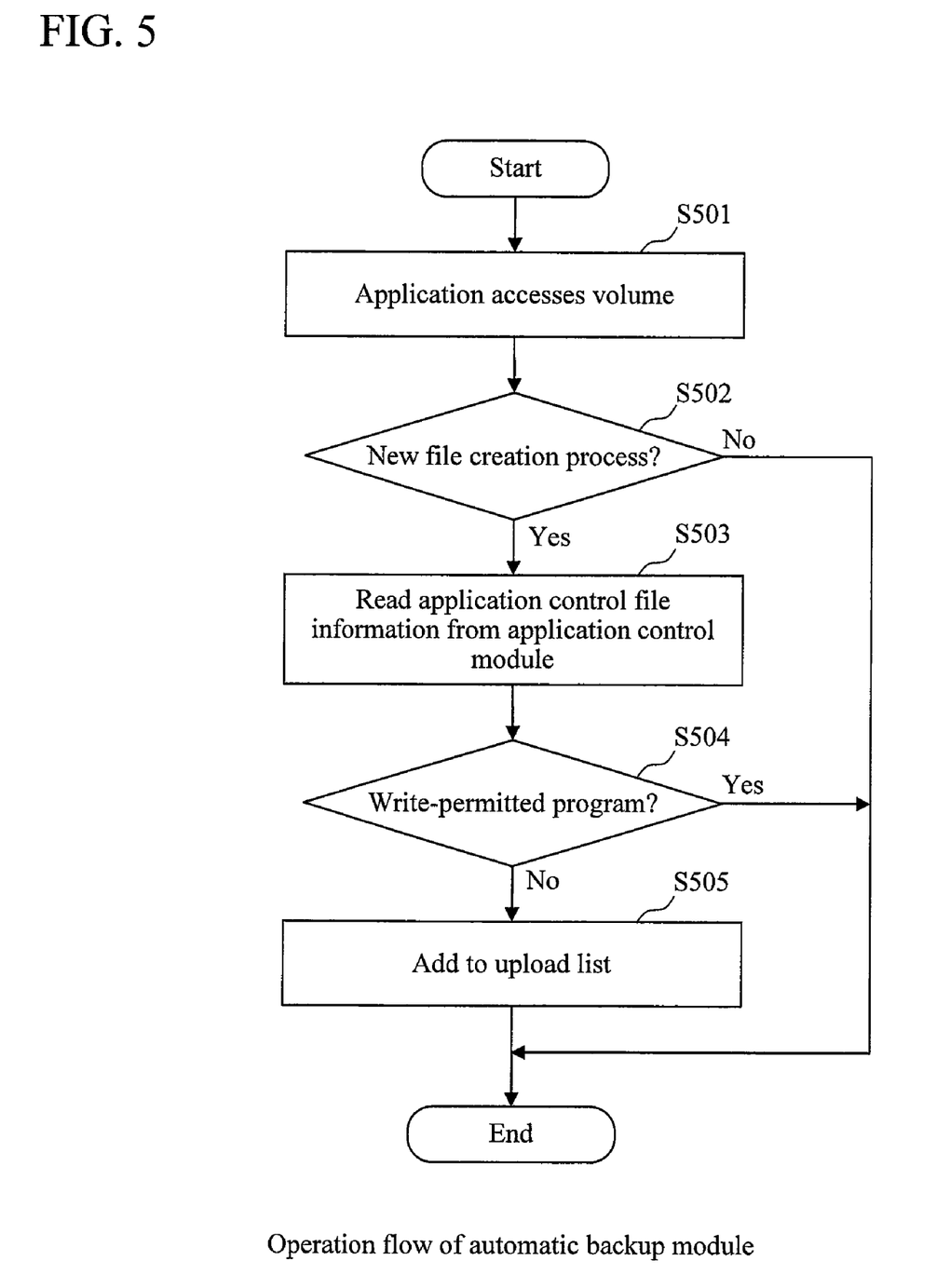
FIG. 5 is a flowchart illustrating the operation of an automatic backup module.

FIG. 5 is a flowchart illustrating the process operation of the automatic backup module 107.

Upon detection of access to the secondary storage device from the application 105 (step S501), the automatic backup module 107 determines if the file access request is a file creation request (step S502).

If the request is determined to be a file creation request, the automatic backup module 107 accesses the file access control module 106, and reads information on the application control file 206 (step S503). Then, the automatic backup module 107 inquires of the OS about the process name of the file creation process and acquires it, and then the automatic backup module 107 compares the acquired name with the process name corresponding to the application name of the list so as to acquire a write flag of the matching entry, and determines if the application is permitted to write data or not (step S504).

If the write flag indicates "FALSE," it means that the relevant file is a "write-inhibited" application file, namely, a target file to be uploaded. Therefore, the automatic backup module 107 additionally registers in the upload list file 209 (Table 2) the file path 903 and the transfer destination path 904 on the file server (step S505).

The upload process will be described in detail with reference to FIG. 7 (a flow at shut-down).

<Operation at Start-Up of User Terminal>

Figure 6:
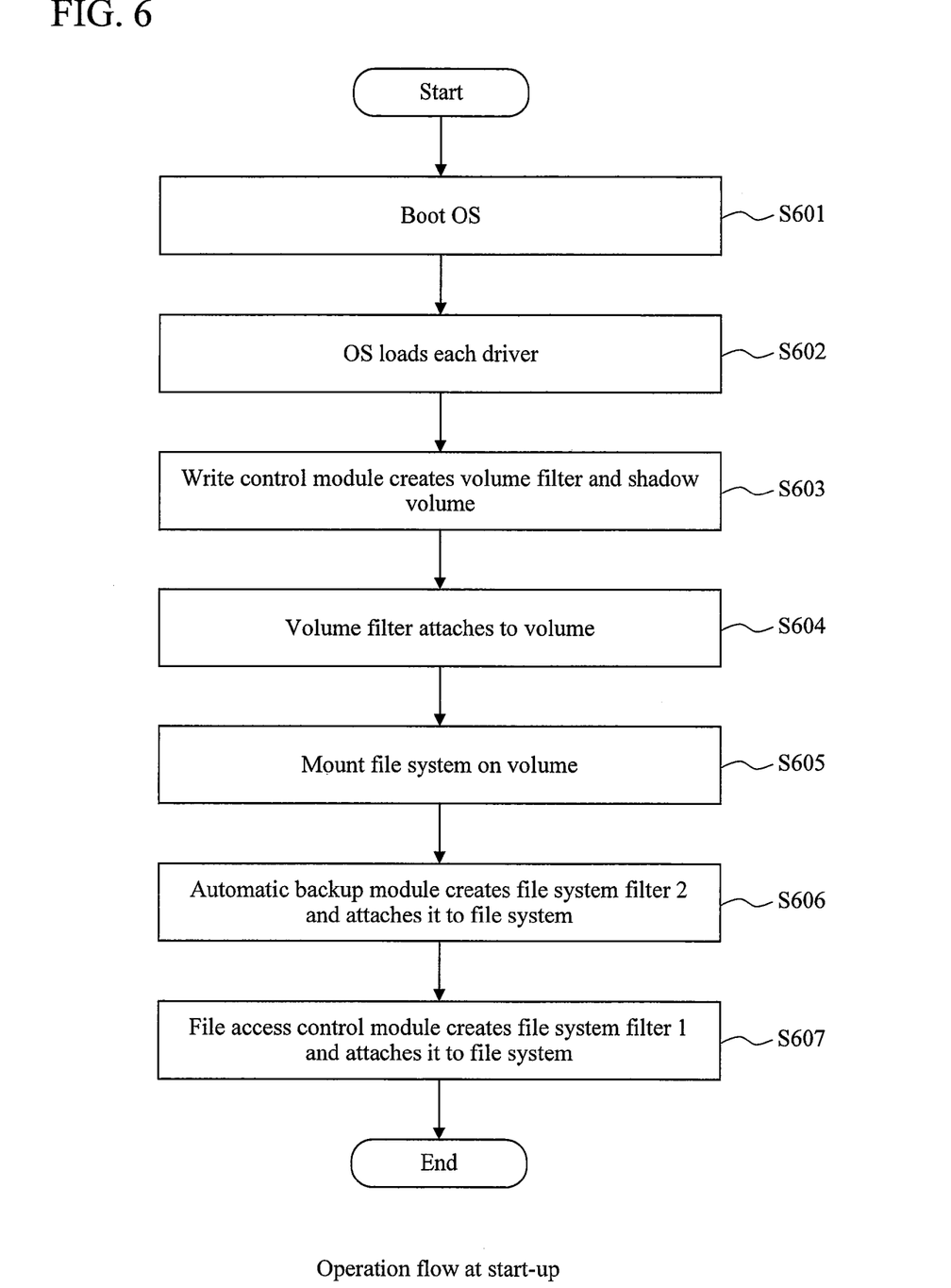
FIG. 6 is a flowchart illustrating the operation at start-up.

FIG. 6 is a flowchart illustrating the process operation when the user terminal 101 is started up.

First, upon start-up of the user terminal 101 by a user, the OS 104 is booted (step S601), whereupon the OS 104 loads each module into the system (step S602).

Next, the write control module 108 creates the volume filter device 212 and the shadow volume device 213 (step S603). In addition, the volume filter device 212 attaches to (is associated with) the volume device 215 (step S604). By this attaching, it becomes possible for the volume filter device 212 to acquire data on the processing when the application 105 accesses the secondary storage device 111.

Next, the OS 104 mounts the file system 210 such as, for example, NTFS or FAT on the volume device 215 (step S605). Then, the automatic backup module 107 creates the file system filter device 2_208, and attaches it to the mounted file system 210. By this attaching, it becomes possible for the file system filter device 2_208 to monitor creation of new files by the application 105.

Finally, the file access control module 106 creates the file system filter device 1_205, and attaches it to the file system 210. Accordingly, it becomes possible for the file system filter device 1_205 to acquire information on the file processing performed to the volume and to sort the file processing.

<Operation at Shut-Down of User Terminal>

Figure 7:
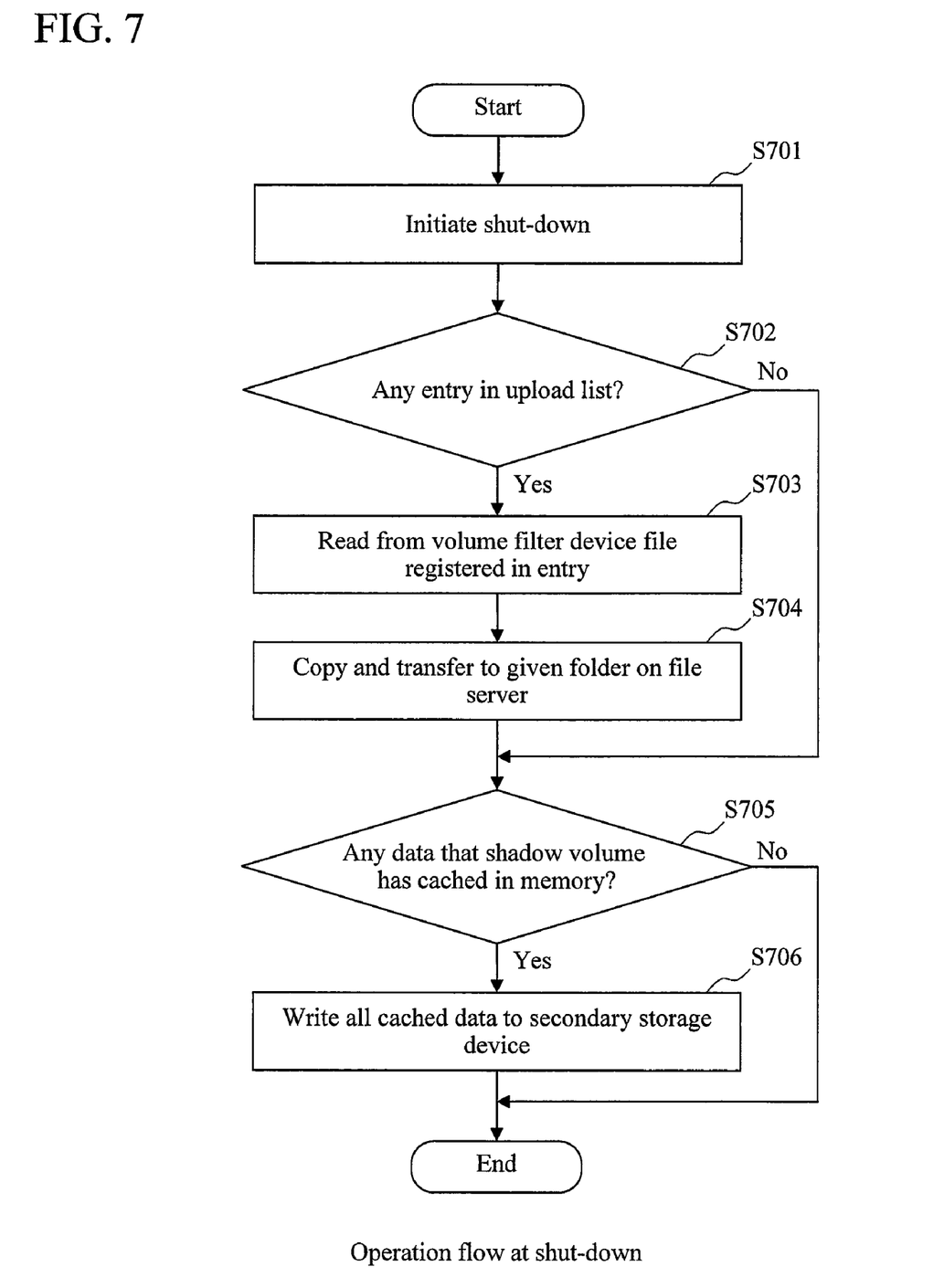
FIG. 7 is a flowchart illustrating the operation at shut-down.

FIG. 7 is a flowchart illustrating the process operation when the user terminal 101 is shut down.

First, upon initiation of shut-down of the user terminal 101 (step S701), the file system filter device 2_208 of the automatic backup module 107 reads the upload list file 209 and determines if there is any entry (step S702). If there is any entry, the file system filter device 2_208 reads a file, which is described in the field of the file path attributes 903 of the entry, from the volume filter device 212 (step S703).

Next, the file system filter device 2_208 transfers and saves the file to the transfer destination path 904 of the entry, that is, to a given location on the file server 201. Such processing is executed for all of the entries in the list. That is, the processing from step S702 to step S704 is repeated until there are no more entries in the upload list file 209.

Upon completion of the processing up to step S704, the shadow volume device 213 checks if the memory 217 contains any data that the shadow volume device 213 has cached (step S705). If the memory 217 contains any such cached data, the shadow volume device 213 writes the cached data to the secondary storage device 111 via the volume device 215 (step S706). Such operations, namely steps S705 and S706 are continued until there is no more cached data.

Upon completion of the aforementioned operations, the user terminal 101 is shut down.

Conclusion

According to the present embodiment, in a user terminal having a secondary storage device, system update data such as a patch for the user terminal and confidential data that should be saved to a server are distinguished when written to the secondary storage device, and separately cashed into memory. Then, the confidential data that should be saved to a file server is automatically uploaded to the file server at any given timing, for example, at shut-down of the terminal. Accordingly, a minimum amount of data can be efficiently saved to the filer server. In addition, it is possible to completely avoid the loss of confidential data that could occur if a user fails to save the confidential data.

In addition to the foregoing, a volume filter device and a shadow volume device are introduced as a write control module, whereby control data (system update data) that is permitted to be written to the secondary storage device and confidential data that is not permitted to be written thereto are cached via different routes. Accordingly, it is possible to store only the system update data of the user terminal into the secondary storage device of the user terminal at shut-down of the user terminal, for example, whereby no confidential data would remain in the user terminal after the shut-down of the user terminal.

Read operation is performed only via the volume filter device. Thus, in order that the system update data can be reflected into the system in real time, the system update data is stored into the cache memory not only via the shadow volume device but also via the volume filter device. It should be noted that the system can also be configured in the following manner: when system data (control data) is accessed, the volume filter device communicates with the shadow volume device to inquire about the presence or absence of any updated system data. If any system update data exists, the volume filter device acquires from the shadow volume device the address of such data in the cache and actually acquires the data. Accordingly, it becomes possible to eliminate the need for retaining duplicate of system update data in the cache memory and to thereby efficiently use the cache area.

In addition, by storing only the cached system update data such as a patch into the secondary storage device of the user terminal at any given timing, for example, at shut-down, it becomes possible to keep the system of the user terminal up-to-date and to prevent confidential data from remaining in the user terminal.

It should be noted that the present invention can also be realized by a program code of software that implements the function of the embodiment. In such a case, a storage medium having recorded thereon the program code is provided to a system or an apparatus, and a computer (or a CPU or a MPU) in the system or the apparatus reads the program code stored in the storage medium. In this case, the program code itself read from the storage medium implements the function of the aforementioned embodiment, and the program code itself and the storage medium having recorded thereon the program code constitute the present invention. As the storage medium for supplying such a program code, for example, a flexible disk, a CD-ROM, a DVD-ROM, a hard disk, an optical disk, a magneto-optical disk, a CD-R, a magnetic tape, a nonvolatile memory card, a ROM, or the like is used.

Further, based on an instruction of the program code, an OS (operating system) running on the computer or the like may perform some or all of actual processes, and the function of the aforementioned embodiment may be implemented by those processes. Furthermore, after the program code read from the storage medium is written to the memory in the computer, the CPU or the like of the computer may, based on the instruction of the program code, perform some or all of the actual processes, and the function of the aforementioned embodiment may be implemented by those processes.

Moreover, the program code of the software that implements the function of the embodiment may be distributed via a network, and thereby stored in storage means such as the hard disk or the memory in the system or the apparatus, or the storage medium such as a CD-RW or the CD-R, and at the point of use, the computer (or the CPU or the MPU) in the system or the apparatus may read the program code stored in the storage means or storage medium and execute the program code.

What is claimed is:

1. A user terminal device constituting part of a thin client system that transfers and stores data to a file server, comprising:
   a secondary storage device;
   file access control means that determines the kind of an I/O request issued to the secondary storage device and determines, if the I/O request is a write request, if an application that is the source of the I/O request is permitted to write data to the secondary storage device;
   write control means that redirects and stores to a cache memory data that has been requested to be written;
   upload data management means that, if the application that is the source of the I/O request is not permitted to write data to the secondary storage device, manages and uploads to the file server the data that has been requested to be written; and
   automatic backup means that reads the data managed by the upload data management means from the cache memory and uploads the data to the file server at a time of shutting down the user terminal device,
   wherein:
   the write control means includes first redirecting means that processes a write request and a read request, and second redirecting means that processes only a write request,
   each of the first redirecting means and the second redirecting means, if the file access control means has determined that the application that is the source of the write request is permitted to write data to the secondary storage device, stores into the cache memory the data that has been requested to be written, and
   the second redirecting means writes the data stored in the cache memory to the secondary storage device at the time of shutting down the user terminal device.

2. The user terminal device according to claim 1, wherein the first redirecting means, if the file access control means has determined that the application that is the source of the write request is not permitted to write data to the secondary storage device, stores into the cache memory the data that has been requested to be written.

3. The user terminal device according to claim 1, wherein the first redirecting means, if the file access control means has determined that the I/O request is a read request, reads from the cache memory or from the secondary storage device data that has been requested to be read.

4. A user terminal device constituting part of a thin client system that transfers and stores data to a file server, comprising:
   a secondary storage device;
   file access control means that determines the kind of an I/O request issued to the secondary storage device and determines, if the I/O request is a write request, if an application that is the source of the I/O request is permitted to write data to the secondary storage device;
   first write control means that processes a write request and a read request; and
   second write control means that processes only a write request,
   wherein each of the first write control means and the second write control means, if the file access control means has determined that the application that is the source of the write request is permitted to write data to the secondary storage device, stores into the cache memory data that has been requested to be written, and
   wherein the second write control means writes the data stored in the cache memory to the secondary storage device at a time of shutting down the user terminal device.

5. The user terminal device according to claim 4, wherein the first write control means, if the file access control means has determined that the application that is the source of the write request is not permitted to write data to the secondary storage device, stores into the cache memory the data that has been requested to be written.

6. A method for controlling a user terminal device having a secondary storage device and constituting part of a thin client system that transfers and stores data to a file server, the method comprising:
   an application determination step in which file access control means determines the kind of an I/O request issued to the secondary storage device and determines, if the I/O request is a write request, if an application that is the source of the I/O request is permitted to write data to the secondary storage device;
   a redirecting step in which write control means redirects and stores to a cache memory data that has been requested to be written;
   a data management step in which upload data management means, if the application that is the source of the I/O request is not permitted to write data to the secondary storage device, manages and uploads to the file server the data that has been requested to be written; and
   an uploading step in which automatic backup means reads the data managed by the upload data management means from the cache memory and uploads the data to the file server at a time of shutting down the user terminal device,
   wherein:
   the write control means includes first redirecting means that processes a write request and a read request, and second redirecting means that processes only a write request, and
   in the redirecting step, each of the first redirecting means and the second redirecting means, if the file access control means has determined that the application that is the source of the write request is permitted to write data to the secondary storage device, stores into the cache memory the data that has been requested to be written, and a step in which the second redirecting means writes the data stored in the cache memory into the secondary storage device at the time of shutting down the user terminal device.

7. The control method according to claim 6, wherein the first redirecting means, if the file access control means has determined that the application that is the source of the write request is not permitted to write data to the secondary storage device, stores into the cache memory the data that has been requested to be written.

* * * * *